(12) United States Patent
Dooley et al.

(10) Patent No.: US 6,868,256 B2
(45) Date of Patent: Mar. 15, 2005

(54) PORTABLE DEVICE INTERACTION WITH BEACONS

(75) Inventors: Saul R. Dooley, Reigate (GB); Robert J. Davies, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 485 days.

(21) Appl. No.: 09/954,643

(22) Filed: Sep. 18, 2001

(65) Prior Publication Data

US 2002/0037700 A1 Mar. 28, 2002

(30) Foreign Application Priority Data

Sep. 25, 2000 (GB) .............................................. 0023425

(51) Int. Cl.[7] ................................................ H04B 5/00
(52) U.S. Cl. ....................... 455/41.1; 455/507; 455/41.2
(58) Field of Search ................................ 455/507, 517, 455/41.1–41.3; 370/338, 328, 312, 313

(56) References Cited

U.S. PATENT DOCUMENTS 5,835,861 A    11/1998  Whiteside .................. 455/466
6,675,015 B1 *  1/2004  Martini et al. .............. 455/436

FOREIGN PATENT DOCUMENTS

WO        WO0120940        3/2001        ............ H04Q/7/38

* cited by examiner

*Primary Examiner*—Melur Ramakrishnaiah
(74) *Attorney, Agent, or Firm*—Dicran Halajian

(57) ABSTRACT

A communication system includes first and second beacon devices capable of wireless message transmission and at least one portable client device capable of receiving such message transmissions. The client device is arranged to broadcast an inquiry message according to a first communication protocol, such as Bluetooth. The first beacon detects such inquiry messages and replies with an inquiry response containing an identifier for the second beacon, enabling the second beacon and client device to perform a service interaction. In an alternative embodiment receipt of the inquiry message is notified to the second beacon which then sends the inquiry response to the client device.

24 Claims, 3 Drawing Sheets

PORTABLE DEVICE INTERACTION WITH BEACONS

The present invention relates to services offered to users of electronic equipment, especially but not exclusively to users of mobile communications devices such as portable telephones and suitably equipped PDA's (personal digital assistants). The invention further relates to means for delivery of such services, and to portable devices for receiving them.

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short range base stations in places like shopping malls to provide location-specific information. This information might include local maps, information on nearby shops and restaurants and so on. The user's CA terminal may be equipped to filter the information received according to pre-stored user preferences and the user is only alerted if an item of data of particular interest has been received.

An example of a CA terminal is given in U.S. Pat. No. 5,835,861 which discloses the use of wireless telephones within the context of advertisement billboards. The user of a wireless telephone obtains the telephone number of a vendor by activating his/her wireless telephone to transmit a prompt signal to an active advertisement source and to receive from the advertisement source a response signal containing the telephone number of the advertising vendor. The telephone number can then be used to automatically place a call to that vendor via the public switched telephone network. Alternatively, the telephone number can be stored for use later on. This arrangement can be used to place a call to a vendor without having to either memorise the telephone number or to write it down. The signals between the billboard and the caller can be transmitted as modulated infrared (IR) signals.

It will be recognised that an important requirement for CA devices is that they quickly and efficiently gather data from beacons such that the user is not required to undertake actions such as staying close to a beacon whilst contact is established between portable device and beacon, nor having to specifically initiate interaction (as is the case with the above-mentioned system in U.S. Pat. No. 5,835,861).

An existing methodology for implementing a radio beacon is to perform a two-step connection process, commencing with the discovery of devices followed by the actual transmission of the information using the same device. Bluetooth, one of the technologies/protocols available for building such systems, requires that the discovery phase is completed before a transmission can take place. When used in a dynamic mobile environment, the time this process takes can often be longer than the actual time the device is in range, causing the information not to reach the client.

A means for reducing the length of this connection process is described in the commonly-assigned United Kingdom patent application no. 0020101.2 entitled "Local Data Delivery Through Beacons". In the communications system described, a first beacon wirelessly broadcasts a series of inquiry messages according to a first communications protocol, such as Bluetooth. A portable device detecting the inquiry message responds with an identifier for itself, which identifier is then passed from the first to a second beacon, with a service interaction then being performed between the second beacon and the portable device.

Whilst this arrangement speeds the interconnection process by freeing the first beacon to continuously issue inquiry messages, without having to periodically stop to interact, it can lead to problems due to the amount of wireless traffic created due to the constant stream of inquiry messages. This constant stream also raises power consumption problems, particularly where the beacon(s) are portable and/or battery powered.

It is therefore an object of the invention to provide a system for the delivery of data via beacons whereby the establishment of a link between beacon and portable device occurs relatively quickly, without excessive wireless traffic and without excessive power drain for a beacon.

In accordance with a first aspect of the present invention there is provided a communications system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier.

With the first (inquirer) beacon sitting in "inquiry scan" mode, rather than transmitting inquiry messages, the volume of over-the-air traffic is greatly reduced, as is the power consumption in the first beacon.

The reply may comprise an inquiry response message, including the address for the second beacon, sent from the first beacon to the portable device. As an alternative, the reply may comprise firstly a notification message, including an identifier for said portable device, sent from the first beacon to the second beacon and, secondly, an inquiry response message, including the address for the second beacon, sent from the second beacon to the portable device. As a further alternative, the reply may comprise firstly a further inquiry message of the first beacon to the portable device, secondly an inquiry response message including an identifier for the portable device and sent from the portable device to the first beacon, and thirdly a notification message, including the identifier for the portable device sent from the first beacon to the second beacon.

The system may comprise a plurality of second beacon devices, with the first beacon arranged to select one of the second beacons whose address is to be made available to the portable device. In such an arrangement, at least one of the plurality of second beacon devices may be operable to transfer an ongoing service interaction with the portable device to a further second beacon device. With such a handover process, the selection of the further second beacon device may be made by the first beacon device, or may be made by the second beacon device performing the ongoing service interaction.

Where the first beacon passes the inquiring portable devices identifier to the second beacon, a secure data channel is preferably provided linking the first and second beacon devices for the transmission of the notification messages. The second beacon device preferably maintains and periodically updates a list of identifiers for portable devices with which a service interaction is being performed.

In the system, the or each inquiry message may be in the form of a plurality of data fields arranged according to the first communications protocol, wherein the portable device is further arranged to add to each inquiry message prior to transmission an additional data field, and wherein the first beacon device is arranged to receive the transmitted inquiry messages and read data from the additional data field. The communications protocol suitably comprises Bluetooth messaging.

The invention further provides a mobile communications device for use in the above system, and comprising a transmitter operable to broadcast the inquiry message, data processing means controlling operation of the same, and a receiver capable of receiving at least a part of the reply, the data processing means supporting the service interaction via the transmitter and receiver. The device receiver is suitably capable of receiving a short-range wireless inquiry message, with the data processing means being operable to process data contained within the message and compose a response message including an identifier for the device, and the transmitter being configured to wirelessly transmit the composed response message to the source of the inquiry message.

Further in accordance with the present invention there is provided a communications infrastructure for use in the above communications system, the infrastructure comprising first and second beacon devices, the beacon devices being capable of wireless message transmission to, and reception from, the at least one portable device, wherein the first beacon is arranged to listen for broadcast of an inquiry message according to a first communications protocol, on detection of such an inquiry message to transmit a reply making available to one of the beacon and the portable device an address or identifier for the other, and wherein the second beacon is configured to perform a service interaction with the portable device when triggered by the making available of the address or identifier.

As above, the reply may comprise an inquiry response message, including the address for the second beacon, sent from the first beacon to the portable device. As an alternative, the reply may comprise firstly a notification message, including an identifier for the portable device, sent from the first beacon to the second beacon and, secondly, an inquiry response message, including the address for the second beacon, sent from the second beacon to the portable device. As a further alternative, the reply may comprise firstly a further inquiry message of the first beacon to the portable device, secondly an inquiry response message including an identifier for the portable device and sent from the portable device to the first beacon, and thirdly a notification message, including the identifier for the portable device sent from the first beacon to the second beacon.

The communications infrastructure may further comprise a plurality of second beacons, and may further comprise message management means operable to initiate and effect handover of an ongoing message transmission session from one of the plurality of second beacons to another.

Further in accordance with the present invention there is provided a method for enabling the user of a portable communications device to perform a service interaction with a beacon device in an environment containing at least first and second beacon devices capable of wireless message transmission and reception, wherein the portable communications device broadcasts an inquiry message according to a first communications protocol, the first beacon device detects such inquiry message and transmits a reply making available to one of the portable device and second beacon device an address or identifier for the other, and the second beacon and portable device perform the service interaction when triggered by the making available of the address or identifier.

As above, the reply may comprise an inquiry response message, including the address for the second beacon, sent from the first beacon to the portable device. As an alternative, the reply may comprise firstly a notification message, including an identifier for the portable device, sent from the first beacon to the second beacon and, secondly, an inquiry response message, including the address for the second beacon, sent from the second beacon to the portable device. As a further alternative, the reply may comprise firstly a further inquiry message of the first beacon to the portable device, secondly an inquiry response message including an identifier for the portable device and sent from the portable device to the first beacon, and thirdly a notification message, including the identifier for the portable device sent from the first beacon to the second beacon.

The second beacon device may maintain and periodically update a list of identifiers for portable devices with which a service interaction is being performed. The inquiry messages may be each in the form of a plurality of predetermined data fields arranged according to the first communications protocol, wherein the portable communications device adds to each inquiry message prior to transmission an additional data field carrying broadcast message data, and wherein the first beacon device receives the transmitted inquiry messages and reads the broadcast data from the additional data field; and the portable communications device may add the additional data field at the end of a respective inquiry message.

Further features and advantages of the present invention are recited in the attached claims, the disclosure of which is incorporated herein by reference, and to which the reader is now directed.

Preferred embodiments of the invention will now be described, by way of example only, and with reference to the accompanying drawings, in which.

In the following description we consider particularly a CA application which utilises Bluetooth protocols for communication of messages between beacon and portable device (whether telephone, PDA or other). As will be recognised, the invention is not restricted to Bluetooth devices, and is applicable to other communications arrangements, in particular frequency hopping systems.

Figure 1:
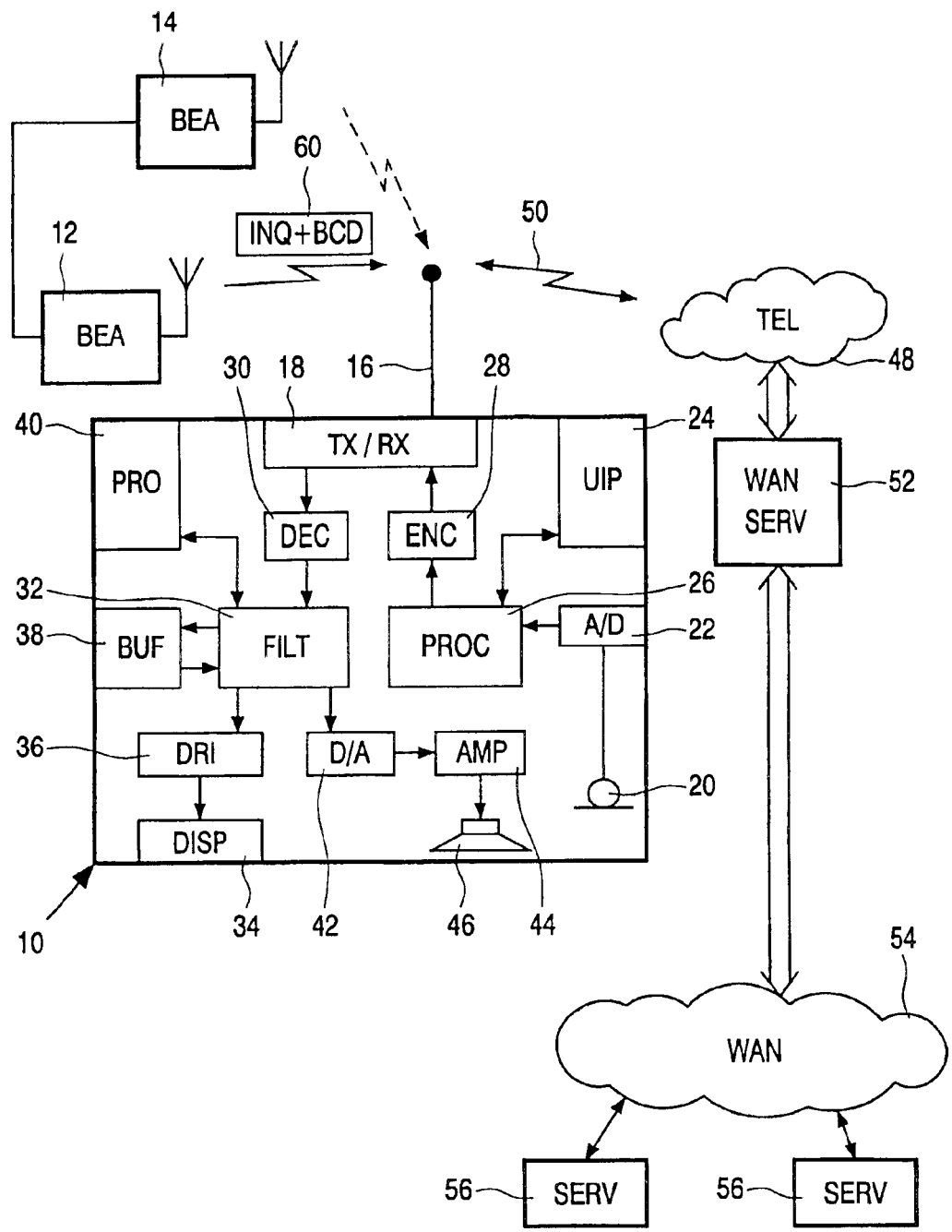
FIG. 1 is a block schematic diagram of a beacon and portable device embodying the invention.

FIG. 1 is a block schematic diagram of a CA mobile telephone 10 in use with a pair of interconnected low power, short range base stations or beacons 12, 14. Such an arrangement may be used in public environments like shopping malls, railway stations, trains, airports, aeroplanes or ships, or private environments such as offices, factories or hospitals to provide location-specific information such as local maps, information on nearby shops and restaurants and so on, with a beacon downloading information keys to a mobile device. An information key is a small data object that provides a reference to a source of full information, and it is in the form of a number of predetermined fields, one of which will contain a short piece of descriptive text presented to a user. Another field will be a pointer or address of some form, for example a URL or telephone number. Other supplementary fields may control how the data is presented to a user and how the address may be exploited. A beacon will generally broadcast cyclically a number of these keys, each typically relating to a different service although, as will be recognised, waiting for the appropriate key can sometimes be a time-consuming business.

The user's CA terminal 10 comprises an aerial 16 coupled with transceiver stage 18 for the reception and transmission of messages. Outgoing messages result from user input to the telephone, either audio input via microphone 20 and A/D converter 22 or other data input via the keypad or other input means 24. These inputs are processed to message data format by signal and data processing stage 26 and converted to transmission format by encoder 28 before being supplied to the transceiver stage 18. As will be described below, the processing to message data format includes the generation of inquiry messages to initiate an interaction with a beacon.

Messages received via the aerial 16 and transceiver 18 are passed via a decoding stage 30 to a filtering and signal processing stage 32. If the data carried by the message is for presentation on a display screen 34 of the telephone, the data will be passed to a display driver 36, optionally after buffering 38, with the driver formatting the display image. As will be recognised, the display 34 may be a relatively simple low-resolution device, and the conversion of received data to display data may be carried out as a subset of the processing stage 32 functionality, without the requirement for a dedicated display driver stage.

Where the message is carrying data from one of the beacons 14, the telephone preferably has the ability to filter the information received according to pre-stored 40 user preferences and the user is only alerted (i.e. the information will only be retained in buffer 38 and/or presented on screen 34) if comparison of stored preference data and subject matter indicators in the message indicate that an item of data of particular interest has been received. This is of particular value if the interaction between telephone and beacons occurs without direct user request, that is to say in a wholly or partially automated manner.

For conventional audio messages, the audio data is output by the filter and processing stage 32, via D/A converter 42 and amplifier 44 to an earphone or speaker 46. Receipt of such messages from the telephone network 48 is indicated by arrow 50: the telephone network 48 also provides the link from the telephone 10 to a wide-area network (WAN) server 52 and, via the WAN 54 (which may be the internet), to one or more remote service providers 56 providing a source of data for the telephone 10.

Communication between the CA terminal (telephone 10) and the CA base stations (beacons 12 and 14) may take two forms: 'push' and 'pull'. In 'push' mode, as described briefly below and in greater detail the abovereferenced United Kingdom patent application no. 0020101.2, inquiry information is broadcast by the beacon 12 to all portable terminals 10 in the form of a short 'key' indicated at 60. The telephone 10 responds to the inquiry key by sending an identifier for itself to the first beacon 12, which then transfers the interaction to the second beacon 14 whilst the first continues to broadcast inquiry keys. The first beacon 12 is labelled as an 'inquirer' beacon and it to sends out Bluetooth inquiry messages constantly. The (or each) other beacons are labelled as 'interactor' beacons and allowed to communicate with terminals 10 on a one-to-one basis on request. Here, the inquiry procedure is performed by an inquirer beacon 12 and the paging procedure by an interactor beacon 14. By delegating the functions this way, it is possible to save a considerable amount of time that would otherwise be lost.

Figure 2:
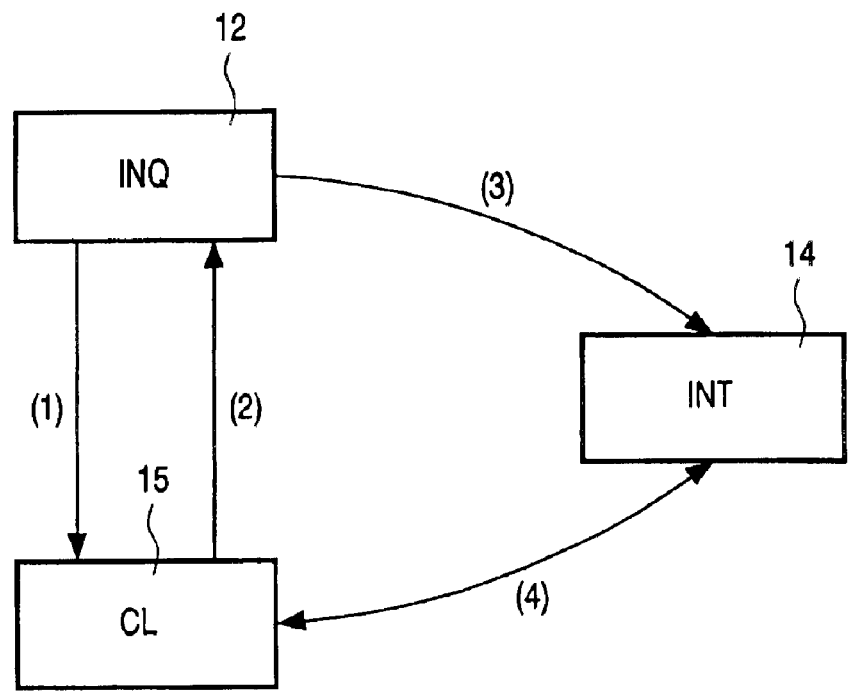
FIG. 2 is a block schematic diagram representing message establishment and handover in a known system of multiple beacons.

FIG. 2 is a block schematic of a dual beacon system from United Kingdom patent application no. 0020101.2 illustrating (by the numbers in parentheses) the sequence of message transmission. The inquirer beacon 12 constantly transmits inquiry packets (1), which are used to discover the identities of any clients—portable devices—in range of the beacon. Once a client 15 comes into range, it will respond to the inquiry (2), giving the inquirer information about its identity.

The information about the client discovered is then transmitted over a secure channel (typically over fixed infrastructure) to the interactor beacon 14 (3)—a beacon solely concerned with transmitting information to the client. This then begins service interaction (4) by issuing a page message containing the client's identity to which the client 15 will respond.

Although the client is obliged to go through the inquiry and paging processes, the fact that the inquirer can issue inquiry packets continuously makes the process much quicker. The use of a separate beacon 14 for all interactions means that the inquirer does not have to pause to issue page messages, nor does it have to stop to allow interactive traffic. The client therefore never has to wait for the inquirer to enter inquiry mode. This in itself is a significant saving of time. As an added bonus, the interactor beacon does not have to wait for an Inquiry cycle to complete before issuing a page message and some seconds can be saved here as well. A downside of this arrangement, however, is the volume of over the air traffic from all the broadcast inquiry messages. Because the inquirer operates continuously, it produces what could be seen as a permanent blanket of radio interference to other nearby users of the 2.4 Ghz band.

Figure 3:
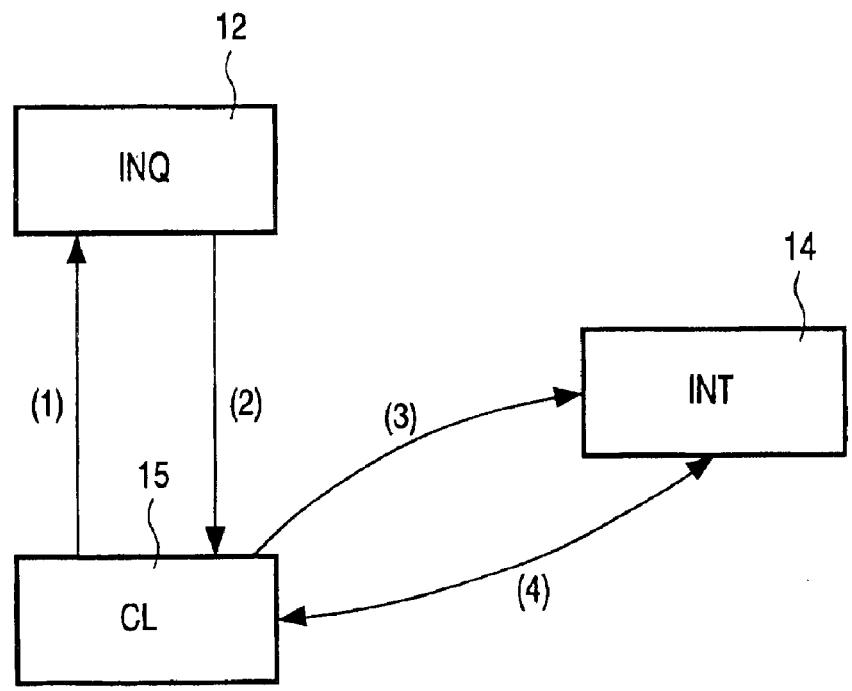
FIGS. 3 to 5 are further block schematic diagrams representing message establishment and handover according to the present invention.

In order to reduce the radio energy transmitted, whilst retaining the efficiency gain of the second beacon, in the present invention the inquirer beacon instead becomes an inquiry response beacon arranged to listen, and only sending out a message when it receives an inquiry packet issued by the portable device. A number of embodiments of this arrangement are provided, a first of which is illustrated in FIG. 3, which is similar to FIG. 2, and illustrates the different ordering of messages, starting at (1) with the sending of an inquiry packet by the client 15. In response, at (2), the first beacon (still referred to herein as inquirer 12 for the purposes of comparison with the arrangement of FIG. 2) replies with an inquiry response message. This message is of the same format as at (2) in FIG. 2, save that instead of the portable device identifier, it now carries an address or identifier for the second (interactor) beacon 14. The client 15 then (3) pages the interactor 14 directly, and sets up a link (4) over which the service interaction between the client 15 and second beacon 14 takes place.

With the first beacon in permanent inquiry scan mode, the client will be handled very quickly when it issues an inquiry. With only the client or those clients that wish to interact transmitting inquiry messages, rather than all inquirer beacons in a location, the volume of wireless traffic is reduced. Also, since the inquiry scan operation may be a single frequency scan, this consumes much less power than the typical 16 frequency inquiry broadcast process of the FIG. 2 system. As will be recognised by the skilled reader, the inquiry scan frequency may be changed at a slow hopping rate to avoid possible jamming.

The inquiry response packets (FHS packets) issued by the fixed beacon can, by use of bits currently spare or by an extension to the FHS packet, convey basic information about the availability of information and services at that beacon site (for example, location information may be added to the packet). This helps the terminal decide whether to continue with the link set up process at that beacon. This approach has the advantage that connection (and exchange of identities) can be avoided. If the data to be appended to the FHS packet is long in length, the data may be subdivided into multiple portions, and multiple FHS packets—each appended with a different data portion—may be sent In an alternative embodiment shown in FIG. 4, the first beacon responds to an inquiry packet (1) by notifying the interactor 14 directly (2) that an inquiry packet has been received and includes an identifier for the requesting client 15. The interactor 14 then performs the inquiry response procedure (3) to again enable establishment of the communications link (4) between client and interactor.

Figure 4:
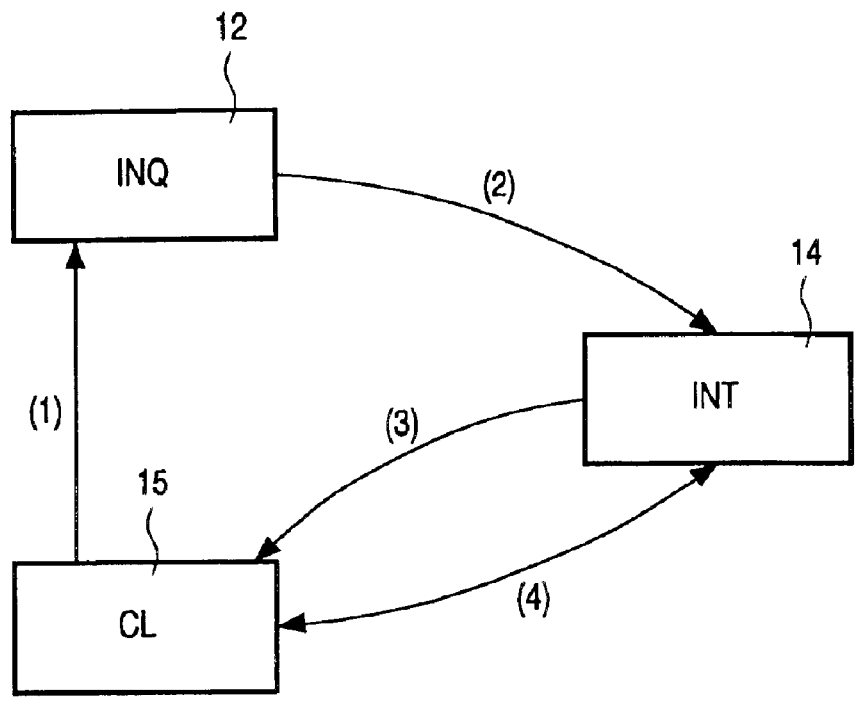

As will be recognised, the scheme of FIG. 2 may be used in conjunction with the arrangements of FIG. 3 or FIG. 4, with a portable client device initially listening for broadcast of an inquiry packet advertising a desired service connection and, if none is heard, proceeding to broadcast its own inquiry packets actively seeking such a service connection. The inquiry packets issued by the terminal can by means of a special Dedicated Inquiry Access Code (DIAC) or by means of an extended field, indicate that it is looking specifically for a beacon service and may also indicate the nature of its request. Beacons unable to fulfil the request need not respond.

Figure 5:
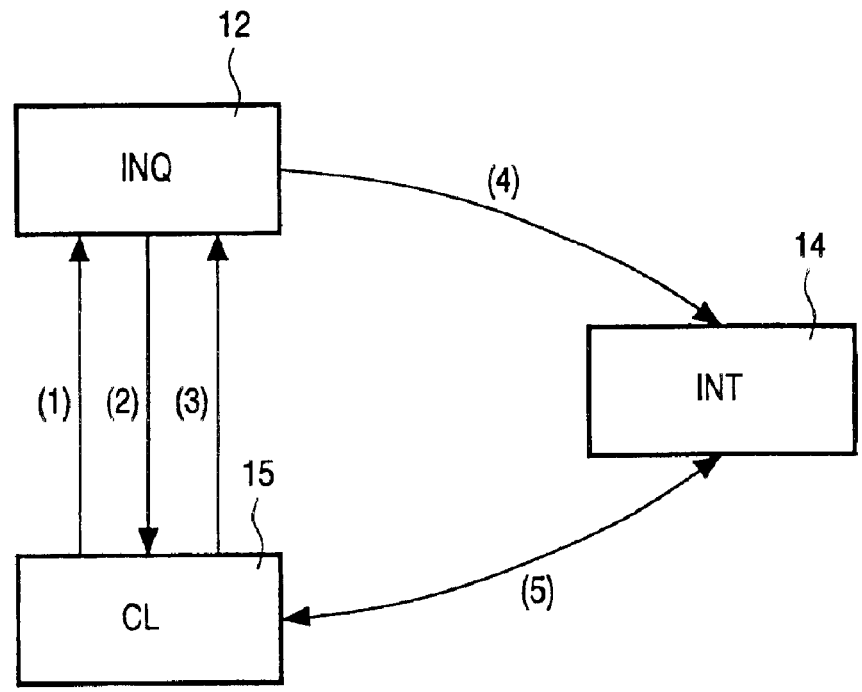

If the majority requirement is the minimisation of needless inquiry packets, the arrangement of FIG. 5 may be used, which arrangement commences with the first beacon 12 being in inquiry scan mode and being 'woken' by receipt of a particular packet (1) from the client requesting wake-up through the DIAC or extended field. The following procedure is then as for FIG. 2, with the first beacon becoming an inquirer and issuing its own inquiry packet (2), the client responding with its identifier (3), the interactor being notified (4), and the service interaction taking place (5).

Whilst described above in terms of single interactor and inquirer beacons, it will be readily understood that the present invention can be extended to larger networks containing several interactors and, often, more than one inquirer.

Multiple interactors can be associated with one inquirer allowing location-specific content to be sent to the client. As with the dual beacon system, the inquirer initiates the service interaction for all interactors in the network. This means that, while a client remains in range of the network, it will only ever have to go through the inquiry process once, with the service connection being handed over from one interactor to another as the client moves around.

From reading the present disclosure, other modifications will be apparent to persons skilled in the art. Such modifications may involve other features which are already known in the design, manufacture and use of fixed and portable communications systems, and systems and components for incorporation therein and which may be used instead of or in addition to features already described herein.

What is claimed is:

1. A communications system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, said reply comprising an inquiry response message, including said address for the said second beacon, sent from said first beacon to said portable device.

2. A system as claimed in claim 1, wherein said first communications protocol comprises Bluetooth messaging.

3. A mobile communications device for use in the system of claim 1, comprising a transmitter operable to broadcast said inquiry message, data processing means controlling operation of the same, and a receiver capable of receiving at least a part of said reply, said data processing means supporting said service interaction via said transmitter and receiver.

4. A communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, wherein said reply comprises firstly a notification message, including an identifier for said portable device, sent from said first beacon to said second beacon and, secondly, an inquiry response message, including said address for said second beacon, sent from said second beacon to said portable device.

5. A system as claimed in claim 4, further comprising a secure data channel linking said first and second beacon devices and for the transmission of said notification messages.

6. A communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, wherein said reply comprises firstly a further inquiry message of the first beacon to the portable device, secondly an inquiry response message including an identifier for the portable device and sent from the portable device to the first beacon, and thirdly a notification message, including said identifier for said portable device sent from said first beacon to said second beacon.

7. A communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, comprising a plurality of second beacon devices, wherein the first beacon is arranged to select one of said second beacons whose address is to be made available to the portable device.

8. A system as claimed in claim 7, wherein at least one of said plurality of second beacon devices is operable to transfer an ongoing service interaction with said portable device to a further second beacon device.

9. A system as claimed in claim 8, wherein the selection of said further second beacon device is made by said first beacon device.

10. A system as claimed in claim 8, wherein the selection of said further second beacon device is made by the second beacon device performing the ongoing service interaction.

11. A communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, wherein the second beacon device maintains and periodically updates a list of identifiers for portable devices with which a service interaction is being performed.

12. A communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier, wherein the or each inquiry message is in the form of a plurality of data fields arranged according to said first communications protocol, wherein the portable device is further arranged to add to each inquiry message prior to transmission an additional data field, and wherein the first beacon device is arranged to receive the transmitted inquiry messages and read data from said additional data field.

13. A mobile communication device for use in a communication system, said communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier;
said mobile communication device comprising a transmitter operable to broadcast said inquiry message, data processing means controlling operation of the same, and a receiver capable of receiving at least a part of said reply, said data processing means supporting said service interaction via said transmitter and receiver, the receiver being capable of receiving a short-range wireless inquiry message, the data processing means being operable to process data contained within said message and compose a response message including an identifier for the device, and said transmitter being configured to wirelessly transmit said composed response message to the source of the inquiry message.

14. A communications infrastructure for use in the communications system, said communication system comprising first and second beacon devices and at least one portable device each capable of wireless message transmission and reception, wherein said at least one portable device is arranged to broadcast an inquiry message according to a first communications protocol, wherein said first beacon device is arranged to detect such an inquiry message and transmit a reply making available to one of said second beacon and said portable device an address or identifier for the other, and wherein said second beacon and portable device are configured to perform a service interaction when triggered by the making available of said address or identifier;
the infrastructure comprising first and second beacon devices, said beacon devices being capable of wireless message transmission to, and reception from, said at least one portable device, wherein said first beacon is arranged to listen for broadcast of an inquiry message according to a first communications protocol, on detection of such an inquiry message to transmit a reply making available to one of said beacon and said portable device an address or identifier for the other, and wherein said second beacon is configured to perform a service interaction with said portable device when triggered by the making available of said address or identifier, wherein said reply comprises an inquiry response message, including said address for said second beacon, sent from said first beacon to said portable device.

15. A communications infrastructure as claimed in claim 14, wherein said reply comprises firstly a notification message, including an identifier for said portable device, sent from said first beacon to said second beacon and, secondly, an inquiry response message, including said address for said second beacon, sent from said second beacon to said portable device.

16. A communications infrastructure as claimed in claim 14, wherein said reply comprises firstly a further inquiry message of the first beacon to the portable device, secondly an inquiry response message including an identifier for the portable device and sent from the portable device to the first beacon, and thirdly a notification message, including said identifier for said portable device sent from said first beacon to said second beacon.

17. A communications infrastructure as claimed in claim 14, further comprising a plurality of second beacons.

18. A communications infrastructure as claimed in claim 17, further comprising message management means operable to initiate and effect handover of an ongoing message transmission session from one of said plurality of second beacons to another.

19. A method for enabling the user of a portable communications device to perform a service interaction with a beacon device in an environment containing at least first and second beacon devices capable of wireless message transmission and reception, wherein said portable communications device broadcasts an inquiry message according to a first communications protocol, the first beacon device detects such inquiry message and transmits a reply making available to one of the portable device and second beacon device an address or identifier for the other, and the second beacon and portable device perform said service interaction when triggered by the making available of said address or identifier, wherein said reply comprises an inquiry response message, including said address for said second beacon, sent from said first beacon to said portable device.

20. A method for enabling the user of a portable communications device to perform a service interaction with a beacon device in an environment containing at least first and second beacon devices capable of wireless message transmission and reception, wherein said portable communications device broadcasts an inquiry message according to a first communications protocol, the first beacon device detects such inquiry message and transmits a reply making available to one of the portable device and second beacon device an address or identifier for the other, and the second beacon and portable device perform said service interaction when triggered by the making available of said address or identifier, wherein said reply comprises firstly a notification message, including an identifier for said portable device, sent from said first beacon to said second beacon and, secondly, an inquiry response message, including said address for said second beacon, sent from said second beacon to said portable device.

21. A method for enabling the user of a portable communications device to perform a service interaction with a beacon device in an environment containing at least first and second beacon devices capable of wireless message transmission and reception, wherein said portable communications device broadcasts an inquiry message according to a first communications protocol, the first beacon device detects such inquiry message and transmits a reply making available to one of the portable device and second beacon device an address or identifier for the other, and the second beacon and portable device perform said service interaction when triggered by the making available of said address or identifier, wherein said reply comprises firstly a further inquiry message of the first beacon to the portable device, secondly an inquiry response message including an identifier for the portable device and sent from the portable device to the first beacon, and thirdly a notification message, including a said identifier for said portable device sent from said first beacon to said second beacon.

22. A method for enabling the user of a portable communications device to perform a service interaction with a beacon device in an environment containing at least first and second beacon devices capable of wireless message transmission and reception, wherein said portable communications device broadcasts an inquiry message according to a first communications protocol, the first beacon device detects such inquiry message and transmits a reply making available to one of the portable device and second beacon device an address or identifier for the other, and the second beacon and portable device perform said service interaction when triggered by the making available of said address or identifier, wherein the second beacon device maintains and periodically updates a list of identifiers for portable devices with which a service interaction is being performed.

23. A method for enabling the user of a portable communications device to perform a service interaction with a beacon device in an environment containing at least first and second beacon devices capable of wireless message transmission and reception, wherein said portable communications device broadcasts an inquiry message according to a first communications protocol, the first beacon device detects such inquiry message and transmits a reply making available to one of the portable device and second beacon device an address or identifier for the other, and the second beacon and portable device perform said service interaction when triggered by the making available of said address or identifier, wherein said inquiry messages are each in the form of a plurality of predetermined data fields arranged according to said first communications protocol, wherein the portable communications device adds to each inquiry message prior to transmission an additional data field carrying broadcast message data, and wherein the first beacon device receives the transmitted inquiry messages and reads the broadcast data from said additional data field.

24. A method as claimed in claim 23, wherein the portable communications device adds said additional data field at the end of a respective inquiry message.

* * * * *